US012655367B2

(12) United States Patent
Jiao et al.

(10) Patent No.: US 12,655,367 B2
(45) Date of Patent: Jun. 16, 2026

(54) CLEANING COMPOSITIONS

(71) Applicant: Fujifilm Electronic Materials U.S.A., Inc., N. Kingstown, RI (US)

(72) Inventors: Jieying Jiao, Chandler, AZ (US); Thomas Dory, Gilbert, AZ (US)

(73) Assignee: Fujifilm Electronic Materials U.S.A., Inc., North Kingstown, RI (US)

( * ) Notice: Subject to any disclaimer, the term of this patent is extended or adjusted under 35 U.S.C. 154(b) by 327 days.

(21) Appl. No.: 18/139,380

(22) Filed: Apr. 26, 2023

(65) Prior Publication Data

US 2024/0010952 A1 Jan. 11, 2024

Related U.S. Application Data

(60) Provisional application No. 63/358,398, filed on Jul. 5, 2022.

(51) Int. Cl.

| | |
|---|---|
| ***C11D 3/00*** | (2006.01) |
| ***C11D 3/30*** | (2006.01) |
| ***C11D 3/34*** | (2006.01) |
| ***C11D 7/50*** | (2006.01) |

(52) U.S. Cl.

CPC .................. *C11D 3/34* (2013.01); *C11D 3/30* (2013.01); *C11D 7/5004* (2013.01); *C11D 2111/22* (2024.01); *C11D 2111/46* (2024.01)

(58) Field of Classification Search

CPC ........... C11D 3/34; C11D 3/30; C11D 7/5004; C11D 2111/22; C11D 2111/46; C11D 7/3245; C11D 7/3218; C11D 3/28; C11D 7/3281; C11D 7/5009; C11D 7/5022; G03F 1/24; G03F 1/82

USPC .......................................................... 510/175

See application file for complete search history.

(56) References Cited

U.S. PATENT DOCUMENTS

| | | | | |
|---|---|---|---|---|
| 5,279,771 | A | 1/1994 | Lee | |
| 5,691,117 | A | 11/1997 | Lutsic et al. | |
| 6,277,205 | B1 | 8/2001 | Nagamura et al. | |
| 6,497,228 | B1 | 12/2002 | Booth et al. | |
| 6,773,873 | B2 * | 8/2004 | Seijo | H01L 21/02071 510/265 |
| 7,001,874 | B2 | 2/2006 | Honda et al. | |
| 7,632,796 | B2 | 12/2009 | Phenis et al. | |
| 8,361,237 | B2 | 1/2013 | Wu et al. | |
| 8,518,865 | B2 | 8/2013 | Rao et al. | |
| 9,158,202 | B2 | 10/2015 | Peters et al. | |
| 9,650,594 | B2 | 5/2017 | Acra et al. | |
| 9,796,953 | B2 | 10/2017 | Kumagai et al. | |
| 10,072,237 | B2 | 9/2018 | Chang et al. | |
| 10,100,272 | B2 | 10/2018 | Ivanov et al. | |
| 10,731,109 | B2 | 8/2020 | Frye et al. | |
| 10,793,812 | B2 | 10/2020 | Moon et al. | |
| 10,927,327 | B2 | 2/2021 | Kamimura et al. | |
| 10,927,329 | B2 | 2/2021 | Takahashi et al. | |
| 10,934,485 | B2 | 3/2021 | Liu et al. | |
| 2001/0039251 | A1 * | 11/2001 | Sachdev | H05K 3/26 510/415 |
| 2007/0256703 | A1 * | 11/2007 | Ikuta | C03C 15/00 134/1 |
| 2008/0200360 | A1 | 8/2008 | Beck et al. | |
| 2010/0216681 | A1 | 8/2010 | Kohinata et al. | |
| 2014/0100151 | A1 | 4/2014 | Egbe et al. | |
| 2014/0370424 | A1 * | 12/2014 | Onoue | B82Y 40/00 430/5 |
| 2015/0159124 | A1 * | 6/2015 | Takahashi | H01L 21/0273 |
| 2016/0116836 | A1 * | 4/2016 | Kim | G03F 1/82 430/5 |
| 2020/0124994 | A1 * | 4/2020 | Ko | G03F 1/72 |
| 2020/0157422 | A1 | 5/2020 | Liu et al. | |
| 2020/0199500 | A1 | 6/2020 | White et al. | |
| 2021/0134589 | A1 | 5/2021 | Weng et al. | |

FOREIGN PATENT DOCUMENTS

| | | | | |
|---|---|---|---|---|
| CN | 104903794 | | 7/2019 | |
| CN | 112748647 | | 5/2021 | |
| JP | 6144468 | | 6/2017 | |
| JP | 6480017 | | 3/2019 | |
| JP | 6629880 | | 1/2020 | |
| KR | 20190128074 | A * | 11/2019 | C11D 3/30 |
| TW | 201527523 | A * | 7/2015 | C11D 7/3281 |
| WO | WO 2007030476 | A2 * | 3/2007 | G03F 1/82 |
| WO | WO 2007/027522 | | 5/2007 | |
| WO | WO 2020/257103 | | 12/2020 | |
| WO | WO 2021/061922 | | 4/2021 | |
| WO | WO 2021/126340 | | 6/2021 | |

OTHER PUBLICATIONS

International Preliminary Report on Patentability in International Appln. No. PCT/US2023/019967, mailed on Jan. 16, 2025, 7 pages.
International Search Report and Written Opinion in International Appln. No. PCT/US2023/019967, mailed on Sep. 14, 2023, 15 pages.

* cited by examiner

*Primary Examiner* — Eisa B Elhilo
(74) *Attorney, Agent, or Firm* — Fish & Richardson P.C.

(57) ABSTRACT

This disclosure relates to compositions for cleaning post etching residues on a semiconductor substrate, as well as related cleaning methods.

10 Claims, No Drawings

CLEANING COMPOSITIONS

CROSS-REFERENCE TO RELATED APPLICATION

The present application claims priority to U.S. Provisional Application Ser. No. 63/358,398, filed on Jul. 5, 2022, the contents of which are hereby incorporated by reference in their entirety.

TECHNICAL FIELD

The present disclosure relates to cleaning compositions for semiconductor substrates and methods of cleaning semiconductor substrates. More particularly, the present disclosure relates to cleaning compositions for semiconductor substrates after etching (e.g., etching metal layers or dielectric material layers deposited on the substrates) and the removal of residues left on the substrates after bulk resist removal.

BACKGROUND

In the manufacture of integrated circuit devices, photoresists are used as an intermediate mask for transferring the original mask pattern of a reticle onto the wafer substrate by means of a series of photolithography and etching (e.g., plasma etching) steps. One of the essential steps in the integrated circuit device manufacturing process is the removal of the patterned photoresist films from the wafer substrate. In general, this step can be carried out by one of two methods.

One method involves a wet stripping step in which the photoresist-covered substrate is brought into contact with a photoresist stripper solution that consists primarily of an organic solvent and an amine. However, such stripper solutions generally cannot completely and reliably remove the photoresist films, especially if the photoresist films have been exposed to UV radiation and plasma treatments during fabrication. Some photoresist films become highly cross-linked by such treatments and are more difficult to dissolve in a stripper solution. In addition, the chemicals used in these conventional wet-stripping methods are sometimes ineffective for removing inorganic or organometallic residual materials formed during the plasma etching of metal or oxide layers with halogen-containing gases.

An alternative method of removing a photoresist film involves exposing a photoresist-coated wafer to oxygen-based plasma in order to burn the resist film from the substrate in a process known as plasma ashing. However, plasma ashing is also not fully effective in removing the plasma etching by-products noted above. Instead, removal of these plasma etch by-products is typically accomplished by subsequently exposing the processed metal and dielectric thin films to certain cleaning solutions.

Metal-containing substrates are generally susceptible to corrosion. For example, substrates containing materials such as aluminum, copper, aluminum-copper alloy, tungsten nitride, tungsten, cobalt, titanium oxide, other metals and metal nitrides, will readily corrode. Further, dielectrics (e.g., interlayer dielectrics or ultra low-k dielectrics) in the integrated circuit devices can be etched by using conventional cleaning chemistries. In addition, the amount of corrosion tolerated by the integrated circuit device manufacturers is getting smaller and smaller as the device geometries shrink.

At the same time, as residues become harder to remove and corrosion must be controlled to ever lower levels, cleaning solutions should be safe to use and environmentally friendly.

Therefore, the cleaning solutions should be effective for removing the etching and/or ashing residues and should also be substantially non-corrosive to all exposed substrate materials.

SUMMARY

The present disclosure is directed to cleaning compositions that are useful for removing residues (e.g., plasma etch and/or plasma ashing residues) from a semiconductor substrate (e.g., an extreme ultraviolet (EUV) photomask) as an intermediate step in a multistep manufacturing process. These residues include a range of relatively insoluble mixtures of organic compounds such as residual photoresist; organometallic compounds; metal oxides such as aluminum oxides (AlOx), silicon oxides (SiOx), titanium oxides (TiOx), zirconium oxides (ZrOx), tantalum oxides (TaOx), and hafnium oxides (HfOx) (which can be formed as reaction by-products from exposed metals); metals such as aluminum (Al), aluminum/copper alloy, copper (Cu), titanium (Ti), tantalum (Ta), tungsten (W), chromium (Cr), ruthenium (Ru), molybdenum (Mo), and cobalt (Co); doped metals such as tungsten doped with boron (B); metal nitrides such as aluminum nitrides (AlN), aluminum oxide nitrides (AlOxNy), silicon nitrides (SiN), silicon oxide nitrides (SiON), titanium nitrides (TiN), tantalum nitrides (TaN), tantalum oxide nitrides (TaON), ruthenium nitrides (RuN), chromium nitrides (CrN), and tungsten nitrides (WN); their alloys; and other materials. An advantage of the cleaning composition described herein is that it can clean a broad range of residues encountered and be generally non-corrosive to exposed substrate materials (e.g., exposed metal oxides (such as AlOx), metals (such as aluminum, aluminum/copper alloy, copper, titanium, tantalum, tungsten, and cobalt), metal nitrides (such as silicon, titanium, tantalum, and tungsten nitrides), and their alloys).

In one aspect, the present disclosure features a cleaning method that includes treating a substrate with a cleaning composition to obtain a treated substrate, and sonicating the treated substrate in the presence of a first rinse solvent to obtain a cleaned substrate. The cleaning composition can include at least one redox agent, at least one chelating agent, at least one organic solvent, at least one alkanolamine, and water.

In another aspect, the present disclosure features a cleaning method that includes sonicating a substrate in the presence of a cleaning composition to obtain a cleaned substrate, in which the cleaning composition can include at least one redox agent, at least one chelating agent, at least one organic solvent, at least one alkanolamine, and water.

In another aspect, the present disclosure features a cleaning method that includes treating a substrate with a first cleaning composition that includes sulfuric acid and hydrogen peroxide to obtain a treated substrate; and treating the treated substrate with a second cleaning composition to obtain a cleaned substrate, in which the second cleaning composition includes at least one redox agent, at least one chelating agent, at least one organic solvent, at least one alkanolamine, and water.

In still another aspect, the present disclosure features a cleaning composition that includes at least one redox agent, at least one chelating agent, at least one organic solvent, at least one alkanolamine comprising methyl diethanolamine, and water.

The details of one or more embodiments of the invention are set forth in the description below. Other features, objects, and advantages of the invention will be apparent from the description and the claims.

DETAILED DESCRIPTION

As defined herein, unless otherwise noted, all percentages expressed should be understood to be percentages by weight to the total weight of the cleaning composition. Unless otherwise noted, ambient temperature is defined to be between about 16 and about 27 degrees Celsius (° C.), such as 25° C.

As used herein, the terms "layer" and "film" are used interchangeably.

As defined herein, a "water-soluble" substance (e.g., a water-soluble alcohol, ketone, ester, or ether) refers to a substance having a solubility of at least 1% by weight in water at 25° C.

In general, the present disclosure is directed to a cleaning composition (e.g., a non-corrosive cleaning composition) including: 1) at least one redox agent; 2) at least one chelating agent; 3) at least one organic solvent; 4) at least one alkanolamine; and 5) water.

In some embodiments, the cleaning compositions of this disclosure can contain at least one (e.g., two, three, or four) redox agent, which is believed to aid in the dissolution of residues on the semiconductor surface such as photoresist residues, metal residues, and metal oxide residues. As used herein, the term "redox agent" refers to a compound that can induce an oxidation and/or a reduction in a semiconductor cleaning process. An example of a suitable redox agent is hydroxylamine. In some embodiments, the redox agent or the cleaning composition described herein does not include a peroxide (e.g., hydrogen peroxide).

In some embodiments, the at least one redox agent can be at least about 0.5% (e.g., at least about 1%, at least about 2%, at least about 3%, at least about 4%, at least about 5%, at least about 6%, at least about 7%, at least about 8%, at least about 9%, at least about 10%, at least about 11%, or at least about 12%) by weight and/or at most about 20% (e.g., at most about 19%, at most about 18%, at most about 17%, at most about 16%, at most about 15%, at most about 14%, at most about 13%, or at most about 12%) by weight of the cleaning compositions of this disclosure.

In some embodiments, the cleaning compositions of this disclosure can contain at least one (e.g., two, three, or four) chelating agent, which can be a polyaminopolycarboxylic acid. For the purposes of this disclosure, a polyaminopolycarboxylic acid refers to a compound with a plurality of (e.g., two, three, or four) amino groups and a plurality of (e.g., two, three, or four) carboxylic acid groups. Suitable classes of polyaminopolycarboxylic acid chelating agents include, but are not limited to, mono- or polyalkylene polyamine polycarboxylic acids, polyaminoalkane polycarboxylic acids, polyaminoalkanol polycarboxylic acids, and hydroxyalkylether polyamine polycarboxylic acids.

Suitable polyaminopolycarboxylic acid chelating agents include, but are not limited to, butylenediaminetetraacetic acid, diethylenetriaminepentaacetic acid (DTPA), ethylenediaminetetrapropionic acid, triethylenetetraminehexaacetic acid, 1,3-diamino-2-hydroxypropane-N,N,N',N'-tetraacetic acid, propylenediaminetetraacetic acid, ethylenediaminetetraacetic acid (EDTA), trans-1,2-diaminocyclohexane tetraacetic acid, ethylendiamine diacetic acid, ethylendiamine dipropionic acid, 1,6-hexamethylene-diamine-N,N,N',N'-tetraacetic acid, N,N-bis(2-hydroxybenzyl)ethylenediamine-N,N-diacetic acid, diaminopropane tetraacetic acid, 1,4,7,10-tetraazacyclododecane-tetraacetic acid, diaminopropanol tetraacetic acid, and (hydroxyethyl)ethylene-diaminetriacetic acid.

In some embodiments, the at least one chelating agent can be at least about 0.01% (e.g., at least about 0.02%, at least about 0.04%, at least about 0.05%, at least about 0.06%, at least about 0.08%, at least about 0.1%, at least about 0.12%, at least about 0.14%, at least about 0.15%, at least about 0.16%, at least about 0.18%, or at least about 0.2%) by weight and/or at most about 1% (e.g., at most about 0.9%, at most about 0.8%, at most about 0.7%, at most about 0.6%, at most about 0.5%, at most about 0.4%, at most about 0.3%, or at most about 0.2%) by weight of the cleaning compositions of this disclosure. Without wishing to be bound by theory, it is believed that the chelating agent can facilitate the dissolution of residues (e.g., post etching residues such as photoresist residues, metal residues, and metal oxide residues) on the semiconductor surface.

In some embodiments, the cleaning compositions of this disclosure can contain at least one (e.g., two, three, four, or more) organic solvent. In some embodiments, the organic solvents suitable for the cleaning compositions of this disclosure can be water soluble organic solvents, such as those selected from the group consisting of water soluble alcohols, water soluble ketones, water soluble esters, water soluble ethers (e.g., glycol diethers), and water soluble sulfoxides (e.g., dimethyl sulfoxide).

Classes of water soluble alcohols include, but are not limited to, alkane diols (including, but not limited to, alkylene glycols), glycols, alkoxyalcohols (including, but not limited to, glycol monoethers), saturated aliphatic monohydric alcohols, unsaturated non-aromatic monohydric alcohols, and low molecular weight alcohols containing a ring structure. Examples of water soluble alkane diols includes, but are not limited to, 2-methyl-1,3-propanediol, 1,3-propanediol, 2,2-dimethyl-1,3-propanediol, 1,4-butanediol, 1,3-butanediol, 1,2-butanediol, 2,3-butanediol, pinacol, and alkylene glycols. Examples of water soluble alkylene glycols include, but are not limited to, ethylene glycol, propylene glycol, hexylene glycol, diethylene glycol, dipropylene glycol, triethylene glycol, and tetraethylene glycol.

Examples of water soluble alkoxyalcohols include, but are not limited to, 3-methoxy-3-methyl-1-butanol, 3-methoxy-1-butanol, 1-methoxy-2-butanol, and water soluble glycol monoethers. Examples of water soluble glycol monoethers include, but are not limited to, ethylene glycol monomethyl ether, ethylene glycol monoethyl ether, ethylene glycol mono n-propyl ether, ethylene glycol monoisopropyl ether, ethylene glycol mono n-butyl ether (also referred to as ethylene glycol butyl ether), diethylene glycol monomethyl ether, diethylene glycol monoethyl ether, diethylene glycol monobutylether, triethylene glycol monomethyl ether, triethylene glycol monoethyl ether, triethylene glycol monobutyl ether, 1-methoxy-2-propanol, 2-methoxy-1-propanol, 1-ethoxy-2-propanol, 2-ethoxy-1-propanol, propylene glycol mono-n-propyl ether, dipropylene glycol monomethyl ether, dipropylene glycol monoethyl ether, dipropylene glycol mono n-propyl ether, tripropylene glycol monoethyl ether, tripropylene glycol monomethyl ether, ethylene glycol monobenzyl ether, and diethylene glycol monobenzyl ether.

Examples of water soluble saturated aliphatic monohydric alcohols include, but are not limited to, methanol, ethanol, n-propyl alcohol, isopropyl alcohol, 1-butanol, 2-butanol, isobutyl alcohol, tert-butyl alcohol, 2-pentanol, t-pentyl alcohol, and 1-hexanol.

Examples of water soluble unsaturated non-aromatic monohydric alcohols include, but are not limited to, allyl alcohol, propargyl alcohol, 2-butenyl alcohol, 3-butenyl alcohol, and 4-penten-2-ol.

Examples of water soluble, low molecular weight alcohols containing a ring structure include, but are not limited to, tetrahydrofurfuryl alcohol, furfuryl alcohol, and 1,3-cyclopentanediol.

Examples of water soluble ketones include, but are not limited to, acetone, cyclobutanone, cyclopentanone, diacetone alcohol, 2-butanone, 2,5-hexanedione, 1,4-cyclohexanedione, 3-hydroxyacetophenone, 1,3-cyclohexanedione, and cyclohexanone.

Examples of water soluble esters include, but are not limited to, ethyl acetate; glycol monoesters such as ethylene glycol monoacetate and diethylene glycol monoacetate; and glycol monoether monoesters such as propylene glycol monomethyl ether acetate, ethylene glycol monomethyl ether acetate, propylene glycol monoethyl ether acetate, and ethylene glycol monoethyl ether acetate.

In some embodiments, the at least one organic solvent can be at least about 1% (e.g., at least about 5%, at least about 10%, at least about 15%, at least about 20%, at least about 25%, at least about 30%, at least about 35%, at least about 40%, at least about 45%, at least about 50%, at least about 55%, or at least about 60%) by weight and/or at most about 70% (e.g., at most about 65%, at most about 60%, at most about 55%, at most about 50%, at most about 45%, at most about 40%, at most about 35%, at most about 30%, at most about 25%, at most about 20%, at most about 15%, or at most about 10%) by weight of the cleaning compositions of this disclosure.

In some embodiments, the cleaning compositions of this disclosure can contain at least one (e.g., two, three, or four) alkanolamine. Examples of suitable alkanolamines include, but are not limited to, monoethanolamine (MEA), diethanolamine, methyl diethanolamine (MDEA), triethanolamine, and aminopropyl-diethanolamine.

Without wishing to be bound by theory, it is believed that the alkanolamine described herein can adjust the pH of the cleaning composition, reduce the surface roughness of the semiconductor substrate treated by the cleaning composition, and reduce the corrosion effects of a cleaning composition by lowering the etch rate of such a cleaning composition towards the exposed substrate materials (e.g., exposed metals or dielectric materials) that are not intended to be removed during the cleaning process.

In some embodiments, the at least one alkanolamine can be at least about 0.05% (e.g., at least about 0.1%, at least about 0.2%, at least about 0.4%, at least about 0.5%, at least about 0.6%, at least about 0.8%, at least about 1%, at least about 1.5%, at least about 2%, at least about 2.5%, at least about 3%, at least about 3.5%, at least about 4%, at least about 4.5%, or at least about 5%) by weight and/or at most about 10% (e.g., at most about 9.5%, at most about 9%, at most about 8.5%, at most about 8%, at most about 7.5%, at most about 7%, at most about 6.5%, at most about 6%, at most about 5.5%, at most about 5%, at most about 4.5%, or at most about 4%) by weight of the cleaning compositions of this disclosure.

In some embodiments, the cleaning compositions of the present disclosure can include water. In some embodiments, the water can be deionized and ultra-pure, contain no organic contaminants and have a minimum resistivity of about 4 to about 17 mega Ohms. In some embodiments, the resistivity of the water is at least 17 mega Ohms.

In some embodiments, water can be at least about 10% (e.g., at least about 12%, at least about 14%, at least about 15%, at least about 16%, at least about 18%, at least about 20%, at least about 22%, at least about 24%, at least about 25%, at least about 26%, at least about 28%, or at least about 30%) by weight and/or at most about 90% (e.g., at most about 85%, at most about 80%, at most about 75%, at most about 70%, at most about 65%, at most about 60%, at most about 55%, at most about 50%, at most about 45%, at most about 40%, at most about 35%, or at most about 30%) by weight of the cleaning compositions of this disclosure.

In some embodiments, the cleaning compositions of this disclosure can optionally contain at least one (e.g., two, three, or four) quaternary ammonium compound (e.g., a quaternary ammonium hydroxide or a salt thereof). Examples of suitable quaternary ammonium hydroxides include, but are not limited to, tetramethylammonium hydroxide (TMAH), tetraethylammonium hydroxide, tetrapropylammonium hydroxide, tetrabutylammonium hydroxide, dimethyldiethylammonium hydroxide, choline, tetraethanolammonium hydroxide, benzyltrimethylammonium hydroxide, benzyltriethylammonium hydroxide, and benzyltributylammonium hydroxide. Without wishing to be bound by theory, it is believed that the quaternary ammonium compound can facilitate the dissolution of residues (e.g., post etching residues such as photoresist residues, metal residues, and metal oxide residues) on the semiconductor surface.

In some embodiments, the at least one quaternary ammonium compound can be at least about 0.1% (e.g., at least about 0.2%, at least about 0.4%, at least about 0.5%, at least about 0.6%, at least about 0.8%, at least about 1%, at least about 1.5%, at least about 2%, at least about 2.5%, at least about 3%, at least about 3.5%, at least about 4%, at least about 4.5%, or at least about 5%) by weight and/or at most about 10% (e.g., at most about 9.5%, at most about 9%, at most about 8.5%, at most about 8%, at most about 7.5%, at most about 7%, at most about 6.5%, at most about 6%, at most about 5.5%, at most about 5%, at most about 4.5%, or at most about 4%) by weight of the cleaning compositions of this disclosure.

In some embodiments, the cleaning compositions of this disclosure can optionally contain at least one (e.g., two, three, or four) corrosion inhibitor. In some embodiments, the corrosion inhibitors can be selected from substituted or unsubstituted benzotriazoles. Without wishing to be bound by theory, it is believed that such cleaning compositions can exhibit significantly improved compatibility with materials that may be present in the semiconductor substrate (e.g., an EUV photomask) and should not be removed by the cleaning compositions, when compared to cleaning compositions without any corrosion inhibitor.

Suitable classes of substituted benzotriazole include, but are not limited to, benzotriazoles substituted by at least one substituent selected from the group consisting of alkyl groups, aryl groups, halogen groups, amino groups, nitro groups, alkoxy groups, and hydroxyl group. Substituted benzotriazoles also include those fused with one or more aryl (e.g., phenyl) or heteroaryl groups.

Suitable benzotriazoles for use as a corrosion inhibitor include, but are not limited to, benzotriazole (BTA), 1-hydroxybenzotriazole, 5-phenylthiol-benzotriazole, 5-chlorobenzotriazole, 4-chlorobenzotriazole, 5-bromobenzotriazole, 4-bromobenzotriazole, 5-fluorobenzotriazole, 4-fluorobenzotriazole, naphthotriazole, tolyltriazole, 5-phenyl-benzotriazole, 5-nitrobenzotriazole, 4-nitrobenzotriazole, 2-(5-amino-pentyl)-benzotriazole, 1-aminobenzotriazole, 5-m ethylbenzotriazole, benzotriazole-5-carboxylic acid, 4-methylbenzotriazole, 4-ethylbenzotriazole, 5-ethylbenzotriazole, 4-propylbenzotriazole, 5-propylbenzotriazole, 4-isopropylbenzotriazole, 5-isopropylbenzotriazole, 4-n-butylbenzotriazole, 5-n-butylbenzotriazole, 4-isobutylbenzotriazole, 5-isobutylbenzotriazole, 4-pentylbenzotriazole, 5-pentylbenzotriazole, 4-hexylbenzotriazole, 5-hexylbenzotriazole, 5-methoxybenzotriazole, 5-hydroxybenzotriazole, dihydroxypropylbenzotriazole, 1-[N,N-bis(2-ethylhexyl)aminomethyl]-benzotriazole, 5-t-butyl benzotriazole, 5-(1',1'-dimethylpropyl)-benzotriazole, 5-(1',1',3'-trimethylbutyl)benzotriazole, 5-n-octylbenzotriazole, and 5-(1',1',3',3'-tetramethylbutyl)benzotriazole.

In some embodiments, the at least one corrosion inhibitor can be at least about 0.01% (e.g., at least about 0.02%, at least about 0.04%, at least about 0.05%, at least about 0.06%, at least about 0.08%, at least about 0.1%, at least about 0.12%, at least about 0.14%, at least about 0.15%, at least about 0.16%, at least about 0.18%, or at least about 0.2%) by weight and/or at most about 1% (e.g., at most about 0.9%, at most about 0.8%, at most about 0.7%, at most about 0.6%, at most about 0.5%, at most about 0.4%, at most about 0.3%, at most about 0.2%, or at most about 0.1%) by weight of the cleaning compositions of this disclosure.

In some embodiments, the cleaning compositions of this disclosure can contain at least one (e.g., two, three, or four) pH adjusting agent (e.g., an acid or a base) to control the pH to a suitable level. In some embodiments, the compositions of this disclosure can have a pH of at least about 8 (e.g., at least about 8.5, at least about 9, at least about 9.5, at least about 10, at least about 10.5, at least about 11, at least about 11.5, at least about 12, at least about 12.5, or at least about 13) to at most about 14 (e.g., at most about 13.5, at most about 13, at most about 12.5, at most about 12, at most about 11.5, at most about 11, at most about 10.5, at most about 10, at most about 9.5, or at most about 9). Without wishing to be bound by theory, it is believed that a cleaning composition having a pH lower than 8 would not be effective in removal residues on a semiconductor substrate (e.g., an EUV photomask). Further, without wishing to be bound by theory, it is believed that a cleaning composition having a pH higher than 14 would result in excessive corrosion to the semiconductor substrate (e.g., an EUV photomask). The effective pH can vary depending on the types and amounts of the ingredients used in the cleaning compositions described herein.

In some embodiments, the pH adjusting agent is free of any metal ion (except for a trace amount of metal ion impurities). Suitable metal ion free pH adjusting agents include acids and bases. Suitable acids that can be used as a pH adjusting agent include carboxylic acids. Exemplary carboxylic acid include, but are not limited to, monocarboxylic acids, bicarboxylic acids, tricarboxylic acids, α-hydroxyacids and p-hydroxyacids of monocarboxylic acids, α-hydroxyacids or p-hydroxyacids of bicarboxylic acids, or α-hydroxyacids and β-hydroxyacids of tricarboxylic acids. Examples of suitable carboxylic acid includes citric acid, maleic acid, fumaric acid, lactic acid, glycolic acid, oxalic acid, tartaric acid, succinic acid, or benzoic acid.

Suitable bases that can be used as a pH adjusting agent include ammonium hydroxide, quaternary ammonium hydroxides, monoamines (including alkanolamines), and amidines (e.g., cyclic amidines). Examples of suitable quaternary ammonium hydroxides include, but are not limited to, tetramethyl ammonium hydroxide, tetraethyl ammonium hydroxide, tetrapropyl ammonium hydroxide, tetrabutyl ammonium hydroxide, dimethyldiethylammonium hydroxide, choline, tetraethanolammonium hydroxide, benzyltrimethylammonium hydroxide, benzyltriethylammonium hydroxide, and benzyltributylammonium hydroxide. Examples of suitable monoamines include, but are not limited to, triethylamine, tributylamine, tripentylamine, diethylamine, butylamine, dibutylamine, and benzylamine. Examples of suitable alkanolamines include, but are not limited to, monoethanolamine, diethanolamine, methyl diethanolamine, triethanolamine, and aminopropyl-diethanolamine. Examples of suitable cyclic amidines include, but are not limited to, 1,8-diazabicyclo[5.4.0]-7-undecene (DBU), and 1,5-diazabicyclo[4.3.0]-5-nonene (DBN).

The amount of the pH adjusting agent required, if any, can vary as the concentrations of the other components (e.g., the redox agent, the chelating agent, and the alkanolamine) are varied in different formulations, and as a function of the molecular weight of the particular pH adjusting agent employed. In some embodiments, the pH adjusting agent can be at least about 0.1% (e.g., at least about 0.2%, at least about 0.4%, at least about 0.5%, at least about 0.06%, at least about 0.8%, at least about 1%, at least about 1.2%, at least about 1.4%, or at least about 1.5%) by weight and/or at most about 3% by weight (e.g., at most about 2.8%, at most about 2.6%, at most about 2.5%, at most about 2.4%, at most about 2.2%, at most about 2%, or at most about 1.8%) by weight of the cleaning compositions of this disclosure.

In some embodiments, the cleaning compositions of the present disclosure can include hydroxylamine, diethylenetriamine pentaacetic acid, at least one organic solvent (e.g., ethylene glycol buty ether, propylene glycol, and/or DMSO), at least one alkanolamine (e.g., MEA or MDEA), and water. In some embodiments, such cleaning compositions can further include 5-m ethylbenzotriazole and/or TMAH.

In some embodiments, the cleaning compositions of the present disclosure can include (1) hydroxylamine in an amount of from about 0.5% to about 20% by weight of the composition; (2) diethylenetriamine pentaacetic acid in an amount of from about 0.01% to about 1% by weight of the composition; (3) at least one organic solvent (e.g., ethylene glycol buty ether, propylene glycol, and/or DMSO) in an amount of from about 1% to about 70% by weight of the composition; (4) at least one alkanolamine (e.g., MEA or MDEA) in an amount of from about 0.1% to about 10% by weight of the composition; and (5) water in an amount of from about 10% to about 90% by weight of the composition; in which the composition has a pH of from about 8 to about 14. In some embodiments, such cleaning compositions can further include TMAH in an amount of from about 0.1% to about 10% by weight of the composition and/or 5-methylbenzotriazole in an amount of from about 0.01% to about 1% by weight of the composition.

In some embodiments, the cleaning compositions of the present disclosure can contain additional additives such as, additional pH adjusting agents, additional corrosion inhibitors, additional organic solvents, surfactants, biocides, and defoaming agents as optional components.

In some embodiments, the cleaning compositions of the present disclosure can specifically exclude or substantially free of one or more of additive components, in any combination, if more than one. Such components are selected from the group consisting of polymers, oxygen scavengers, quaternary ammonium compounds (e.g., salts or hydroxides), alkaline bases (such as NaOH, KOH, LiOH, $Mg(OH)_2$, and $Ca(OH)_2$), surfactants (e.g., cationic, anionic, or non-ionic surfactants), defoamers, fluorine-containing compounds (e.g., fluoride compounds or fluorinated compounds (such as fluorinated polymers/surfactants)), silicon-containing compounds such as silanes (e.g., alkoxysilanes), nitrogen-containing compounds (e.g., amino acids, amines, imines (e.g., amidines such as 1,8-diazabicyclo[5.4.0]-7-undecene (DBU) and 1,5-diazabicyclo[4.3.0]non-5-ene (DBN)), amides, or imides), abrasives (e.g., ceria abrasives, non-ionic abrasives, surface modified abrasives, negatively/positively charged abrasive, or ceramic abrasive composites), plasticizers, oxidizing agents (e.g., peroxides, hydrogen peroxide, ferric nitrate, potassium iodate, potassium permanganate, nitric acid, ammonium chlorite, ammonium chlorate, ammonium iodate, ammonium perborate, ammonium perchlorate, ammonium periodate, ammonium persulfate, tetramethylammonium chlorite, tetramethylammonium chlorate, tetramethylammonium iodate, tetramethylammonium perborate, tetramethylammonium perchlorate, tetramethylammonium periodate, tetramethylammonium persulfate, urea hydrogen peroxide, and peracetic acid), corrosion inhibitors (e.g., azole or non-azole corrosion inhibitors), electrolytes (e.g., polyelectrolytes), silicates, cyclic compounds (e.g., azoles (such as diazoles, triazoles, or tetrazoles), triazines, and cyclic compounds containing at least two rings, such as substituted or unsubstituted naphthalenes, or substituted or unsubstituted biphenylethers), chelating agents, buffering agents, acids such as organic acids (e.g., carboxylic acids such as hydroxycarboxylic acids, polycarboxylic acids, and sulfonic acid) and inorganic acids (e.g., sulfuric acid, sulfurous acid, nitrous acid, nitric acid, phosphorous acid, and phosphoric acid), pyrrolidone, polyvinyl pyrrolidone, salts (e.g., halide salts or metal salts), and catalysts (e.g., metal-containing catalysts). As used herein, a component that is "substantially free" from a cleaning composition refers to an ingredient that is not intentionally added into the cleaning composition. In some embodiments, a cleaning composition described herein can have at most about 1000 ppm (e.g., at most about 500 ppm, at most about 250 ppm, at most about 100 ppm, at most about 50 ppm, at most about 10 ppm, or at most about 1 ppm) of one or more of the above components that are substantially free from the cleaning composition. In some embodiments, the cleaning compositions described herein can be completely free of one or more of the above components.

The cleaning compositions described herein can be prepared by simply mixing the components together, or can be prepared by blending two compositions in a kit.

In some embodiments, the cleaning compositions of the present disclosure are not specifically designed to remove bulk photoresist films from semiconductor substrates. Rather, the cleaning compositions of the present disclosure can be designed to remove all residues after bulk photoresist removal by dry or wet stripping methods. Therefore, in some embodiments, the cleaning methods of the present disclosure are preferably employed after a dry or wet photoresist stripping process. This photoresist stripping process is generally preceded by a pattern transfer process, such as an etch or implant process, or it is done to correct mask errors before pattern transfer. The chemical makeup of the residue will depend on the process or processes preceding the cleaning step.

Any suitable dry stripping process can be used to remove bulk photoresist from semiconductor substrates. Examples of suitable dry stripping processes include oxygen based plasma ashing, such as a fluorine/oxygen plasma or a $N_2/H_2$ plasma; ozone gas phase-treatment; fluorine plasma treatment, hot $H_2$ gas treatment (such as that described in U.S. Pat. No. 5,691,117 incorporated herein by reference in its entirety), and the like. In addition, any conventional organic wet stripping solution known to a person skilled in the art can be used to remove bulk resist from semiconductor substrates.

A preferred stripping process used in combination with the cleaning method of the present disclosure is a dry stripping process. Preferably, this dry stripping process is the oxygen based plasma ashing process. This process removes most of the photoresist from the semiconductor substrate by applying a reactive-oxygen atmosphere at elevated temperatures (typically 250° C.) at vacuum conditions (i.e., 1 torr). Organic materials are oxidized by this process and are removed with the process gas. However, this process generally does not remove all inorganic or organometallic contamination from the semiconductor substrate. A subsequent cleaning of the semiconductor substrate with the cleaning composition of the present disclosure is typically necessary to remove those residues.

In some embodiments, the present disclosure features methods of cleaning residues (e.g., post etching and/or post ashing residues) from a semiconductor substrate. Such methods can be performed, for example, by contacting a semiconductor substrate containing post etch residues and/or post ash residues with a cleaning composition described herein. The method can further include rinsing the semiconductor substrate with a rinse solvent after the contacting step and/or drying the semiconductor substrate after the rinsing step.

In some embodiments, the semiconductor substrate can be an EUV photomask. In some embodiments, the EUV photomask can include a highly reflective multilayer coating (which can include alternating layers (e.g., 40-50 alternating layers) of silicon and molybdenum) on a substrate (e.g., a low thermal expansion material such as glass), and reflective multilayer coating can be subsequently over-coated with a patterned absorber layer (e.g., a layer containing TaN and/or TaON). In some embodiments, the EUV photomask can include at least one material (e.g., an exposed material) or a layer of the at least one material, where the material is selected from the group consisting of a low thermal expansion material (e.g., glass), TaON, TaN, Ru, RuN, Si, $SiO_2$, SiON, Ti, TiN, Cr, CrN, or Mo. In some embodiments, the cleaning methods of this disclosure do not substantially remove the above materials on an EUV photomask exposed to a cleaning composition. For example, in some embodiments, the cleaning methods of this disclosure remove no more than about 5% (e.g., no more than about 3%, no more than about 1%, no more than about 0.5%, or no more than about 0.1%) by weight of any of the above materials on an EUV photomask.

In some embodiments, the semiconductor substrates to be cleaned can be a non-EUV photomask or any other suitable semiconductor substrate that has post etching or post ashing residues. Examples of non-EUV photomasks include those used for radiations at wavelengths of 365 nm, 248 nm, and 193 nm. In some embodiments, the cleaning methods described herein do not substantially remove certain exposed materials on such a semiconductor substrate, such as metals (e.g., Co, Cu, W or W doped with B), oxides (e.g., aluminum oxides (AlOx or $Al_2O_3$), silicon oxides (SiOx), or zirconium oxide (ZrOx)), nitrides (eg., TiN or SiN), and poly-Si. For example, in some embodiments, the cleaning methods of this disclosure remove no more than about 5% by weight (e.g., no more than about 3% by weight, no more than about 1% by weight, no more than about 0.5% by weight, or no more than about 0.1% by weight) of any of the above materials in the semiconductor substrate.

In some embodiments, the semiconductor substrate (e.g., an EUV and non-EUV photomask) to be cleaned in this method can contain organic and organometallic residues, and additionally, a range of metal oxides that need to be removed. Semiconductor substrates typically are constructed of silicon, silicon germanium, Group III-V compounds like GaAs, or any combination thereof. The semiconductor substrates can additionally contain exposed integrated circuit structures such as interconnect features (e.g., metal lines and dielectric materials). Metals and metal alloys used for interconnect features include, but are not limited to, aluminum, aluminum alloyed with copper, copper, titanium, tantalum, cobalt, and silicon, titanium nitride, tantalum nitride, tungsten, and their alloys. The semiconductor substrate can also contain layers of interlayer dielectrics, silicon oxide, silicon nitride, silicon carbide, titanium oxide, and carbon doped silicon oxides.

In some embodiments, this disclosure features a first cleaning method that includes treating a substrate (e.g., a semiconductor substrate such as an EUV photomask) with a cleaning composition described herein to obtain a treated substrate (i.e., a cleaning step), and sonicating the treated substrate in the presence of a first rinse solvent to obtain a cleaned substrate (i.e., a sonicating rinse step or a sonicating step). In some embodiments, treating a substrate with a cleaning composition does not involve sonicating the substrate in the cleaning composition.

The semiconductor substrate can be treated with a cleaning composition by any suitable method, such as placing the cleaning composition into a tank and immersing and/or submerging the semiconductor substrate into the cleaning composition, spraying the cleaning composition onto the semiconductor substrate, streaming the cleaning composition onto the semiconductor substrate, or any combinations thereof. Preferably, the semiconductor substrates are immersed into the cleaning composition.

In some embodiments, the cleaning compositions of this disclosure can be effectively used to treat or clean a semiconductor substrate at either the room temperature (e.g., from about 16° C. to about 27° C. such as 25° C.) or at an elevated temperature of from at least about 55° C. (e.g., at least about 60° C., at least about 65° C., or at least about 70° C.) to at most about 80° C. (e.g., at most about 75° C., at most about 70° C., at most about 65° C., or at most about 60° C.).

In general, cleaning times can vary over a wide range depending on the particular cleaning method and temperature employed. For example, a suitable cleaning time can be from at least about 1 minute (e.g., at least about 3 minutes or at least about 5 minutes) to at most about 10 minutes (e.g., at most about 8 minutes or at most about 5 minutes).

In some embodiments, a cleaning method of this disclosure (e.g., the first cleaning method described above) can be repeated in multiple cycles (e.g., two, three, or four cycles). In some embodiments, each cycle can include cleaning by using a cleaning composition described herein, rinsing, and optionally drying. In embodiments when a cleaning method of this disclosure is repeated in multiple cycles, the cleaning time in each cycle can be relatively short and can range from about 1 minute to about 5 minutes. In embodiments when a cleaning method of this disclosure is not repeated, the cleaning time can be relatively long and can range from about 5 minute to about 10 minutes. Without wishing to be bound by theory, it is believed that repeating the cleaning methods described herein in multiple cycles can reduce the cleaning time in each cycle while maintaining the cleaning efficacy, which can reduce the overall cleaning time.

In some embodiments, to further promote the cleaning ability of the cleaning compositions of the present disclosure, mechanical agitation means can be employed when the semiconductor substrate is immersed in a cleaning composition. Examples of suitable agitation means include circulation of the cleaning composition over the substrate, streaming or spraying the cleaning composition over the substrate, and ultrasonic or megasonic agitation during the cleaning process. The orientation of the semiconductor substrate relative to the ground may be at any angle. Horizontal or vertical orientations are preferred.

The cleaning compositions of the present disclosure can be used in conventional cleaning tools known to those skilled in the art. A significant advantage of the cleaning compositions of the present disclosure is that they include relatively non-toxic, non-corrosive, and non-reactive components in whole and in part, whereby the cleaning compositions are stable in a wide range of temperatures and process times. The cleaning compositions of the present disclosure are chemically compatible with practically all materials used to construct existing and proposed semiconductor wafer cleaning process tools for batch and single wafer cleaning.

Subsequent to the cleaning, the semiconductor substrate can undergo a sonicating rinse step in which the substrate is sonicated in the presence of a first rinse solvent to remove the cleaning composition or other residues on the substrate. In some embodiments, the semiconductor substrate is immersed in the first rinse solvent in this sonicating rinse step. In some embodiments, the first rinse solvent can include water (e.g., deionized water). In some embodiments, this sonicating rinse step can be performed at an elevated temperature, such as from at least about 40° C. (e.g., at least about 45° C. or at least about 50° C.) to at most about 60° C. (e.g., at most about 55° C. or at most about 50° C.).

In general, the sonicating rinse step can be performed in any suitable sonicator known in the art. In some embodiments, the sonicating rinse step can be performed at a suitable ultrasonic frequency. For example, the sonicating rinse step can be performed at an ultrasonic frequency of at least about 20 KHz (e.g., at least about 30 KHz or at least about 40 KHz) and/or at most about 1 MHz (e.g., at most about 80 KHz, at most about 60 KHz, or at most about 50 KHz). Without wishing to be bound by theory, it is believed that performing the sonicating rinse step at a relatively high ultrasonic frequency can facilitate the cleaning of the semiconductor substrate and shorten the rinse time.

In general, rinse time can vary over a wide range depending on the particular cleaning method and temperature employed. For example, a suitable rinse time in the entire cleaning method or in each cycle of the cleaning method can be from at least about 10 seconds (e.g., at least about 15 seconds, at least about 30 seconds, or at least about 1 minute) to at most about 5 minutes (e.g., at most about 4 minutes or at most about 2 minutes).

In some embodiments, the semiconductor substrate can optionally be rinsed with a second rinse solvent after the above sonicating rinse step. In some embodiments, the second rinse solvent can include isopropyl alcohol. In some embodiments, rinsing the semiconductor substrate with a second rinse solvent can be performed either with sonication or without sonication. In embodiments when the semiconductor substrate is rinsed with a second rinse solvent with sonication, this step can be performed in the same manner as the sonicating rinse step using the first rinse solvent. In some embodiments, the semiconductor substrate can be rinsed with a second rinse solvent between 16° C. and 27° C. (e.g., 25° C.) fora duration of from 10 seconds to 5 minutes.

In some embodiments, the first or second rinse solvent can be a suitable rinse solvent other than those described above. Examples of suitable rinse solvents include, but are not limited to, deionized (DI) water, methanol, ethanol, isopropyl alcohol, N-methylpyrrolidinone, gamma-butyrolactone, dimethyl sulfoxide, ethyl lactate, and propylene glycol monomethyl ether acetate. Alternatively, aqueous rinses with pH>8 (such as dilute aqueous ammonium hydroxide) can be employed. The rinse solvent can be applied to a semiconductor substrate using methods similar to that used in applying a cleaning composition described herein. The cleaning composition may have been removed from the semiconductor substrate prior to the start of the rinsing step or it may still be in contact with the semiconductor substrate at the start of the rinsing step. In some embodiments, rinsing with the first or second rinse solvent can be repeated multiple times (e.g., two, three, or four times) within each cycle of cleaning by using a cleaning composition, rinsing, and optional drying.

Optionally, the semiconductor substrate is dried after one of more of the above rinse steps. Any suitable drying method known in the art can be employed. Examples of suitable drying methods include spin drying, flowing a dry gas across the semiconductor substrate, or heating the semiconductor substrate with a heating device such as a hotplate or infrared lamp, Marangoni drying, Rotagoni drying, IPA drying, or any combinations thereof. Drying times depend on the specific method employed but are typically on the order of from 30 seconds to 5 minutes.

In some embodiments, this disclosure features a second cleaning method that includes sonicating a substrate (e.g., a semiconductor substrate such as an EUV photomask) in the presence of a cleaning composition described herein to obtain a cleaned substrate (i.e., a sonicating clean step). In some embodiments, the substrate is immersed in the cleaning composition in the sonicating clean step. In some embodiments, this sonicating clean step can be performed under conditions the same as, or similar to, the conditions used in the sonicating rinse step described above. For example, the sonicating clean step can be performed at an ultrasonic frequency of at least about 20 KHz (e.g., at least about 30 KHz or at least about 40 KHz) and/or at most about 1 MHz (e.g., at most about 80 KHz, at most about 60 KHz, or at most about 50 KHz). In some embodiments, the sonicating clean step can be performed at a temperature of from at least about 55° C. (e.g., at least about 60° C., at least about 65° C., or at least about 70° C.) to at most about 80° C. (e.g., at most about 75° C., at most about 70° C., at most about 65° C., or at most about 60° C.). In some embodiments, a suitable sonicating time can be from at least about 1 minute (e.g., at least about 3 minutes or at least about 5 minutes) to at most about 10 minutes (e.g., at most about 8 minutes or at most about 5 minutes).

Subsequent to the above sonicating clean step, the semiconductor substrate can undergo one or more rinse steps in which the substrate is rinsed by using a suitable rinse solvent (e.g., a first or second rinse solvent described herein) to remove the cleaning composition or other residues on the substrate. For example, the substrate can be rinsed with a first rinse solvent containing isopropyl alcohol one or more times (e.g., two times) and then rinsed with a second rinse solvent containing water one or more times (e.g., two times).

In some embodiments, each rinse step can be performed under conditions the same as, or similar to, the conditions used in the rinse step described above. For example, the semiconductor substrate can be rinsed with the first or second rinse solvent between 16° C. and 27° C. (e.g., 25° C.) for a duration of from at least about 10 seconds (e.g., at least about 15 seconds, at least about 30 seconds, or at least about 1 minute) to at most about 5 minutes (e.g., at most about 4 minutes or at most about 2 minutes). In general, each rinse step after the sonicating clean step can be performed with sonication or without sonication.

Optionally, the semiconductor substrate can be dried after one of more of the rinse steps using the same drying methods described above.

In some embodiments, the second cleaning method of this disclosure can be repeated in multiple cycles (e.g., two, three, or four cycles) and each cycle can include cleaning by using a cleaning composition, rinsing by using the first or second rinse solvent, and optionally drying.

In some embodiments, this disclosure features a third cleaning method that includes treating a substrate (e.g., a semiconductor substrate such as an EUV photomask) with a first cleaning composition containing sulfuric acid and hydrogen peroxide to obtain a treated substrate (i.e., the first cleaning step); and treating the treated substrate with a second cleaning composition to obtain a cleaned substrate (i.e., the second cleaning step), in which the second cleaning composition is a cleaning composition described herein. In some embodiments, the substrate is immersed in the first or second cleaning composition.

In some embodiments, the first cleaning composition includes sulfuric acid and hydrogen peroxide at a weight ratio of at least about 1:1 (e.g., at least about 2:1, at least about 3:1, or at least about 4:1) and/or at most about 8:1 (e.g., at most about 7:1, at most about 6:1, or at most about 5:1).

In general, the first or second cleaning step can be performed either with sonication or without sonication. In embodiments when sonication is used, the sonication can be performed in a manner the same as or similar to the sonicating clean step described above.

In some embodiments, the first and second cleaning steps can be performed at suitable temperatures. In some embodiments, the first cleaning step can be performed at a temperature of from at least about 80° C. (e.g., at least about 85° C., at least about 90° C., or at least about 95° C.) to at most about 110° C. (e.g., at most about 105° C., at most about 100° C., or at most about 95° C.). In some embodiments, the second cleaning step can be performed at a temperature of from at least about 55° C. (e.g., at least about 60° C., at least about 65° C., or at least about 70° C.) to at most about 80° C. (e.g., at most about 75° C., at most about 70° C., at most about 65° C., or at most about 60° C.).

In some embodiments, the first and second cleaning steps can be performed for suitable durations. In some embodiments, a suitable cleaning time for the first or second cleaning step can be from at least about 1 minute (e.g., at least about 3 minutes or at least about 5 minutes) to at most about 10 minutes (e.g., at most about 8 minutes or at most about 5 minutes).

Subsequent to the first or second clean step, the semiconductor substrate can undergo one or more rinse steps in which the substrate is rinsed by using a suitable rinse solvent to remove the cleaning composition or other residues on the substrate. In some embodiments, the substrate can be rinsed with a first rinse solvent containing water (e.g., deionized water) one or more times (e.g., two times) after the first cleaning step. In some embodiments, the substrate can be rinsed with a second rinse solvent containing isopropyl alcohol one or more times (e.g., two times) and then rinsed with a third rinse solvent containing water one or more times (e.g., two times) after the second cleaning step.

In some embodiments, each rinse step can be performed under conditions the same as, or similar to, the conditions used in the rinse step described above. For example, the semiconductor substrate can be rinsed with the first, second, or third rinse solvent between 16° C. and 27° C. (e.g., 25° C.) for a duration of from at least about 10 seconds (e.g., at least about 15 seconds, at least about 30 seconds, or at least about 1 minute) to at most about 5 minutes (e.g., at most about 4 minutes or at most about 2 minutes). In general, each rinse step can be performed with sonication or without sonication.

Optionally, the semiconductor substrate can be dried after one of more of the rinse steps using the same drying methods described above.

In some embodiments, the third cleaning method of this disclosure can be repeated in multiple cycles (e.g., two, three, or four cycles) and each cycle can include cleaning by using the first and second cleaning compositions, rinsing by using the first, second, or third rinse solvent, and optionally drying.

In some embodiments, the first, second, or third cleaning method described above can further include forming a semiconductor device (e.g., an integrated circuit device such as a semiconductor chip) from the semiconductor substrate obtained by the method described above.

In some embodiments, a method of manufacturing an EUV photomask using a cleaning composition described herein can include the following steps. First, a layer of a photoresist is applied to a semiconductor substrate. The semiconductor substrate thus obtained can then undergo a pattern transfer process, such as an etch or implant process, to form an EUV photomask. The bulk of the photoresist can then be removed by a dry or wet stripping method (e.g., an oxygen based plasma ashing process). Remaining residues on the EUV photomask can then be removed using a cleaning composition described herein in the manner described above. The EUV photomask can subsequently be used to form one or more integrated circuits on the substrate, which can be processed to form into a semiconductor chip by, for example, assembling (e.g., dicing and bonding) and packaging (e.g., chip sealing).

The contents of all publications cited herein (e.g., patents, patent application publications, and articles) are hereby incorporated by reference in their entirety.

EXAMPLES

The present disclosure is illustrated in more detail with reference to the following examples, which are for illustrative purposes and should not be construed as limiting the scope of the present disclosure. Any percentages listed are by weight (wt %) unless otherwise specified. Controlled stirring during testing was done with a 1 inch stirring bar at 400 rpm unless otherwise noted.

General Procedure 1

Formulation Blending

Samples of cleaning compositions were prepared by adding, while stirring, to the calculated amount of organic solvent the remaining components of the formulation. After a uniform solution was achieved, optional additives, if used, were added.

General Procedure 2A

Evaluation of First Cleaning Method in a Single Cycle

The first cleaning method described above in a single cycle was evaluated using the following procedure.

The cleaning of PER (Post Etch Residue) from an EUV photomask was carried out with the cleaning compositions described below using an EUV photomask coupon, which included a glass substrate sequentially coated with 40-50 alternating layers of silicon and molybdenum, a Ru based layer, and an absorber layer containing TaN and TaON. that had been patterned lithographically, etched in a plasma metal etcher, and followed by oxygen plasma ashing to remove the top layer of photoresist completely.

A test coupon was held using 4" long plastic locking tweezers, whereby the coupon could then be suspended into a 500 ml volume beaker containing approximately 200 milliliters of a cleaning composition of the present disclosure. The cleaning test was then carried out by placing the coupon which was held by the plastic tweezers into the cleaning composition in such a way that the PER layer containing side of the coupon faced the stir bar. The coupon was left static in the cleaning composition at 55° C., 65° C., or 75° C. for 5 or 10 minutes while the composition was under controlled stirring. When the desired cleaning time was completed, the coupon was quickly removed from the cleaning composition.

The cleaned coupon was then placed into a Branson M3800H sonicator and immersed in 600 ml DI water that was heated to 50° C. The rinse was performed by sonicating the coupon in the DI water at an ultrasonic frequency of KHz for one minute. The rinsed coupon was then removed from the sonicator, rinsed by isopropyl alcohol for 15 seconds (by immersing the coupon in isopropyl alcohol) twice, and dried with flow $N_2$.

General Procedure 2B

Evaluation of First Cleaning Method in Multiple Cycles

The first cleaning method described above in multiple cycles was evaluated using the following procedure.

A test coupon was held using 4" long plastic locking tweezers, whereby the coupon could then be suspended into a 500 ml volume beaker containing approximately 200 milliliters of a cleaning composition of the present disclosure. The cleaning test was then carried out by placing the coupon which was held by the plastic tweezers into the cleaning composition in such a way that the PER layer containing side of the coupon faced the stir bar. The coupon was left static in the cleaning composition at 55° C., 65° C., or 75° C. for 1, 3, or 5 minutes while the composition was under controlled stirring. When the desired cleaning time was completed, the coupon was quickly removed from the cleaning composition.

The cleaned coupon was then placed into a Branson M3800H sonicator and immersed in 600 ml DI water that was heated to 50° C. The rinse was performed by sonicating the coupon in the DI water at an ultrasonic frequency of 40 KHz for one minute. The rinsed coupon was then removed from the sonicator, rinsed by isopropyl alcohol for 15 seconds (by immersing the coupon in isopropyl alcohol) twice.

After the clean and rinse processes were repeated four times, the coupon was dried with flow $N_2$.

General Procedure 3

Evaluation of Second Cleaning Method

The second cleaning method described above was evaluated using the following procedure.

A test EUV photomask coupon was placed in a Branson M3800H sonicator and immersed in a 200 ml of a cleaning composition that was heated to 75° C. The cleaning was performed by sonicating the coupon in the cleaning composition at an ultrasonic frequency of 40 KHz for five minutes. When the desired cleaning time was completed, the coupon was quickly removed from sonicator. The cleaned coupon was rinsed with isopropyl alcohol for 15 seconds twice and then rinsed with DI water for 15 seconds, and dried with flow $N_2$. The rinse was performed by immersing a coupon in isopropyl alcohol or DI water. The above process was repeated four times.

General Procedure 4

Evaluation of Third Cleaning Method

The third cleaning method described above was evaluated using the following procedure.

A test EUV photomask coupon was cleaned in a first cleaning composition containing sulfuric acid and hydrogen peroxide at a weight ratio of 4:1 at 90-100° C. using the same cleaning procedure described in General Procedure 2. The cleaning was performed by immersing the coupon in the first cleaning 30 composition with gentle stirring for three minutes. When the desired cleaning time was completed, the coupon was quickly removed from the first cleaning composition. The cleaned coupon was rinsed once with DI water for 15 seconds.

The rinsed coupon obtained above was cleaned in a second cleaning composition (which was a cleaning composition of this disclosure) using the same cleaning procedure described in General Procedure 2 at 65° C. or 75° C. for five minutes. When the desired cleaning time was completed, the coupon was quickly removed from second cleaning composition. The cleaned coupon was rinsed sequentially with isopropyl alcohol for 15 seconds twice and DI water for 15 seconds, and dried with flow $N_2$. All rinses described in this procedure were performed by immersing a coupon in isopropyl alcohol or DI water.

Example 1

Formulation Examples 1-11 (FE-1 to FE-11) were prepared according to General Procedure 1, and evaluated according to General Procedures 2A-4. The formulations are summarized in Table 1 and the cleaning results are summarized in Table 2.

TABLE 1

| Ex. | HA | DTPA | PG | EGBE | DMSO | MDEA | TMAH | DI Water | Total | PH |
|---|---|---|---|---|---|---|---|---|---|---|
| FE-1 | 12% | 0.2% | 15% | None | None | 0.275 % | None | 72.525 % | 100% | 9.07 |
| FE-2 | 12% | 0.2% | 15% | None | 40% | 2 % | 2% | 28.8 % | 100% | 12.56 |
| FE-3 | 12% | 0.2% | 15% | None | 40% | 3 % | 4% | 25.8 % | 100% | 13.76 |
| FE-4 | 12% | 0.2% | 15% | None | 15% | 2 % | 2% | 53.8 % | 100% | 12.53 |
| FE-5 | 10% | 0.2% | 15% | None | 40% | 1 % | 2% | 31.8 % | 100% | 13.25 |
| FE-6 | 5% | 0.2% | 15% | None | 40% | 1 % | 2% | 36.8 % | 100% | 13.84 |
| FE-7 | 12% | 0.2% | 10% | None | 40% | 2 % | 2% | 33.8 % | 100% | 12.50 |
| FE-8 | 5% | 0.2% | None | None | 40% | 2 % | 2% | 50.8 % | 100% | 13.86 |
| FE-9 | 12% | 0.2% | None | 15% | 40% | 3 % | 4% | 25.8 % | 100% | 13.82 |
| FE-10 | 12% | 0.2% | None | 10% | 40% | 3 % | 4% | 30.8 % | 100% | 13.78 |
| FE-11 | 12% | 0.2% | None | 6% | 40% | 3 % | 4% | 34.8 % | 100% | 13.79 |

HA = hydroxylamine; DTPA = diethylenetriaminepentaacetic acid; PG = propylene glycol; DMSO = dimethylsulfoxide; MDEA = methyldiethanolamine; TMAH = tetramethylammonium hydroxide; EGBE = ethylene glycol monobutyl ether.

TABLE 2

| Ex. | Cleaning Temp (° C.) | Cleaning Results from First Cleaning Method: Single Cycle | Cleaning Results from First Cleaning Method: Multiple cycle | Cleaning Results from Second Cleaning Method | Cleaning Results from Third Cleaning Method |
|---|---|---|---|---|---|
| FE-1 | 75 | N/A | Pass | N/A | Clean |
| FE-2 | 75 | N/A | Clean | Clean | Clean |
| FE-3 | 75 | N/A | Clean | Clean | Clean |
| | 65 | N/A | Clean | Clean | N/A |
| | 55 | Clean | Clean | N/A | N/A |
| FE-4 | 55 | N/A | Clean | N/A | N/A |
| FE-5 | 55 | N/A | Clean | N/A | N/A |
| FE-6 | 55 | N/A | Clean | N/A | N/A |
| FE-7 | 55 | N/A | Clean | N/A | N/A |
| FE-8 | 55 | N/A | Clean | N/A | N/A |
| FE-9 | 55 | N/A | Clean | N/A | N/A |
| FE-10 | 55 | N/A | Clean | N/A | N/A |
| FE-11 | 55 | N/A | Clean | N/A | N/A |

Pass = Most visible residue under SEM have been removed.
Clean = No visible residue under SEM.
N/A = Not available.

As shown in Tables 1 and 2, formulations FE-1 to FE-11 were effective in removing all post etching residues from EUV photomasks by using the first, second, or third cleaning method described herein.

Other embodiments are within the scope of the following claims.

What is claimed is:

1. A cleaning method, comprising:

treating a substrate with a cleaning composition to obtain a treated substrate, the cleaning composition comprising at least one redox agent, at least one chelating agent, at least one organic solvent, at least one alkanolamine, and water; wherein the composition has a pH from about 12 to about 14; and sonicating the treated substrate in the presence of a first rinse solvent to obtain a cleaned substrate.

2. The method of claim 1, wherein the substrate is an extreme ultraviolet (EUV) photomask.

3. The method of claim 2, wherein the extreme ultraviolet (EUV) photomask comprises a low thermal expansion material, TaON, TaN, Ru, RuN, Si, $SiO_2$, SiON, Ti, TiN, Cr, CrN, or Mo.

4. The method of claim 1, wherein the treating step is performed at a temperature of from about 55° C. to about 75° C.

5. The method of claim 1, wherein the treated substrate is immersed in the first rinse solvent in the sonicating step.

6. The method of claim 1, wherein the first rinse solvent comprises water.

7. The method of claim 1, wherein the sonicating step is performed at a temperature of from about 40° C. to about 60° C.

8. The method of claim 1, further comprising sonicating the treated substrate in the presence of a second rinse solvent.

9. The method of claim 8, wherein the second rinse solvent is isopropanol.

10. The method of claim 1, further comprising drying the cleaned substrate.

* * * * *